United States Patent [19]

Hvolka

[11] Patent Number: 4,856,378
[45] Date of Patent: Aug. 15, 1989

[54] VARIABLE SPEED TRANSMISSION

[75] Inventor: Dusan J. Hvolka, Salt Lake City, Utah

[73] Assignee: DJH Engineering Center, Inc., Salt Lake City, Utah

[21] Appl. No.: 146,429

[22] Filed: Jan. 21, 1988

Related U.S. Application Data

[63] Continuation-in-part of Ser. No. 742,997, Jun. 10, 1985, abandoned, which is a continuation-in-part of Ser. No. 667,983, Nov. 5, 1984, abandoned.

[51] Int. Cl.[4] .......................... F16H 1/28; F16H 53/00
[52] U.S. Cl. ..................................... 74/804; 74/568 R
[58] Field of Search ................. 74/804, 805, 568, 571, 74/63, 793, 796

[56] References Cited

U.S. PATENT DOCUMENTS

| | | | |
|---|---|---|---|
| 1,449,352 | 3/1923 | Seeck | 74/63 |
| 1,543,791 | 6/1925 | Pitter | 74/63 |
| 1,831,577 | 11/1931 | Richer | 74/804 |
| 2,204,514 | 6/1940 | Schlote | 74/117 X |
| 2,285,910 | 6/1942 | Buigne | 74/804 X |
| 2,293,695 | 8/1942 | Bloosevitch | 74/571 L |
| 2,370,383 | 2/1945 | Wallace et al. | 74/571 L |
| 2,874,594 | 2/1959 | Sundt | 74/805 |
| 3,468,175 | 9/1969 | Rabek | 74/63 |
| 3,472,097 | 10/1969 | Huska | 74/760 |
| 4,183,267 | 1/1980 | Jackson | 74/804 |
| 4,262,556 | 4/1981 | Hart | 74/805 |
| 4,394,112 | 7/1983 | Woodling | 74/805 |
| 4,520,693 | 6/1985 | Sfredda | 74/804 |

FOREIGN PATENT DOCUMENTS

| | | | |
|---|---|---|---|
| 369406 | 3/1939 | Italy | 74/805 |
| 1036979 | 1/1982 | U.S.S.R. | 74/805 |
| 605156 | 7/1948 | United Kingdom | 74/805 |
| 1204466 | 9/1970 | United Kingdom | 74/805 |

*Primary Examiner*—Rodney H. Bonck
*Assistant Examiner*—David Novais
*Attorney, Agent, or Firm*—Marcus G. Theodore

[57] ABSTRACT

The invention is a variable speed transmission for adjusting the output of a drive shaft. It comprises a journal mounted rotatable casing with an internal cyclical periodic track selectively pushed by a plurality of reciprocating push rods activated by a variably extendable cam mounted to a drive shaft. The torque ratios are directly proportional to the degree the push rods are extended by the extendable cam.

13 Claims, 7 Drawing Sheets

VARIABLE SPEED TRANSMISSION

RELATED APPLICATIONS

This application is a continuation-in-part application of the previously filed co-pending continuation-in-part application dated 6/10/85, entitled "VARIABLE SPEED TRANSMISSION", Ser. No. 06/742,997, (now abandoned), which is a continuation-in-part of the original application dated Nov. 5, 1984, entitled "VARIABLE SPEED TRANSMISSION", Ser. No. 06/667,983, (now abandoned) Group Art Unit 352.

BACKGROUND OF THE INVENTION

1. Field

This invention relates to transmission and speed reducers, and more particularly to a variable speed transmission for adjusting the output of a drive shaft. The device enables the user to optimally set the torque input from a power source and then vary the torque output of the drive train by adjusting the rotational speed via the variable speed transmission.

2. State of the Art

Various transmissions and speed reducers are known. W. C. Pitter, U.S. Pat. No. 1,543,791 discloses a transmission gearing system utilizing a plurality of plungers cooperatively associated with a transmission gearing comprising a circumferentially toothed element. The plungers are reciprocated by an offset cam of fixed displacement to push against the toothed element; thereby moving said element in response to the action of the plungers. Pitter does not provide a variable speed transmission. Its torque ratios are fixed by the number of teeth in relationship to the number of plungers.

J. W. Rabek, U.S. Pat. No. 3,468,175, dicloses several transmission embodiments. The most relevant embodiment discloses a transmission utilizing a wave gear coupled with reciprocating elements activating an undulating surface of the wave gear in response to the action of a fixed displacement cam. Either the wave gear or reciprocating elements may function as an input driving element. The torque ratios of the transmission are determined by the ratio of the number of waves in one gear to the number of reciprocating elements. The Rabek fluid column oscillator embodiment provides a variable speed transmission altering the torque outputs by adjustment of the displacement of the fluid column oscillators. However, it requires complex hydraulic circuitry and timing means to properly displace the fluid column oscillators.

Huska, U.S. Pat. No. 3,472,097 discloses a reversible speed reducer utilizing two relatively rotatable control elements and a driving element with circumferentially spaced bearings. The control elements are preferably of sinesoidal form, with one acting as a rotatable and concentric driving element, and the other as an eccentric spaced bearing element. Said device provides reversibility of rotation of a drive shaft. The cage like configuration is utilized to adjust the path of the bearings as the relative position of the sinesoidal tracks of the control elements are varied affecting the speed output as well as countering the eccentric movement of the driving element in a reverse mode.

E. V. Sundt, U.S. Pat. No. 2,874,594, discloses another speed reducer. The principal object of Sundt is to provide an improved differential type speed reducer which achieves high efficiencies of over 90 percent. Sundt interposes rolling elements, such as balls and rollers, between the oscillating members of rotor and gear members to reduce frictional losses.

F. W. Seek, U.S. Pat. No. 1,449,352, discloses a greater planetary transmission utilizing three annular members concentric about a common shaft. One of said members is stationary and the other two revolve around the shaft. The outer and inner members are spaced apart and provided with opposed cam surfaces and an inner member comprising an annular body in which are journaled a series of rollers. The device provides fixed output based upon the number of rollers and displacement of said rollers along the annular member.

Cited for general interest is Woodling, U.S. Pat. No. 4,394,112, disclosing a combination roller set having roller teeth with concave surfaces disposed to engage one another.

None of the above inventions disclose a variable speed transmission utilizing a variable displacement cam mounted on a drive shaft which selectively forces a series of circumferentially mounted retractable push rods or bearings against the periodic track of a journal mounted casing causing the casing to rotate proportionally to the degree of cam displacement.

SUMMARY OF THE INVENTION

The variable speed transmission of applicant's invention provides a highly efficient transmission particularly adapted for constant speed inputs. It provides a smooth non-pulsating operation through the full 360° degrees of rotation of a cam at all speeds and operating torques. The transmission also provides radial motion affording high power outputs within a narrow profile. The directional rotation of the transmission casing is determined by the rotation of a center variable throw cam. The key feature of the transmission is its ability to develop full operational torque when starting as well as at low speeds by simply extending the variable cam. Favorable efficiencies at low speeds and fractional r.p.m.'s are readily obtained.

The invention comprises a dynamic rotating extendable cam attached to a drive shaft. Means, such as a hydraulic or mechanical cylinder system, are associated with the cam to displace said cam a predetermined distance from the shaft selected by the user. Surrounding the cam and shaft is a housing journal mounted to the drive shaft having a chamber to accommodate the cam's variable dynamic rotation. The housing has a plurality of radically displaced equidistant apertures in communication with the interior chamber and exterior of the housing. A plurality of push rods having first ends and second ends are slideably mounted within the apertures. The first ends of the push rods extend into the interior of the housing to be selectively contacted by the cam. The second ends of the push rods are structured to extend beyond the housing a predetermined distance when selectively activated by the cam. A rotatable casing is journal mounted to the drive shaft encasing the housing. The interior of said casing is structured as a cyclical periodic track with peaks and valleys along which the second ends of the push rods travel. The shape of the track approximates the loci of the second ends of the push rods as they are selectively activated by the fully extended cam. For a cam with a circular cross-section, the track is sinesoidal. For a cam with a polygonal cross-section, the periodic track has flattened periodic segments between the peaks and valleys. As the push rods are selectively contacted by the cam, the second ends push against the incline of the track causing the casing to rotate. To minimize frictional losses because the cam and the push rods or bearings, a plurality of rolling elements such as needle bearings may be positioned therebetween. The casing torque produced is proportional to the degree the cam extends the seconds ends of the push rods against the incline of the track. Preferably, the displacement of the cam varies the torque ratios in excess of one to one. Means and then associated with the casing to translate the rotational output.

The casing directional rotation is determined by the clockwise or counterclockwise rotation of the cam—i.e. the casing rotates in the opposite direction as does the cam. In other embodiments, the inputs may drive the casing, with the shaft producing variable outputs as the cam is adjusted to utilize the invention as a speed reducer. Thus, inputs to the drive shaft, the extended cam, and the rotatable casing, may all be adjusted to provide combinations of various torque inputs or outputs, in a manner similar to the operation of a planetary gearing system.

The periodic track of the casing has two less periods than the number of push rods. The push rods may be structured as retractable bearings, such as needle or roller bearings, for use with high speed and relatively low torque inputs generated by moped and automobile engines. In this embodiment, the retractable bearings roll along the track and are selectively contacted by the cam to push against the incline of the track and rotate the casing. The retractable push rods or bearings are generally biased outward for the second ends to run along the track. The preferred number of push rods is generally from six to twelve, with the number of peaks of the track being two less—i.e. preferable from four to ten.

The push rods, or retractable bearings, are sized, when extended fully by the cam, to contact the incline of the track, stopping short of the bottom valleys of the track to prevent gear shock. The variable cam at maximum extension thus extends the push rods or retractable bearings to provide a maximum force against the track to provide optimum speed. At intermediate extension, the variable cam extends the second ends to push against the upper and middle segments of the peaks to provide lesser speed. At minimum extension, the variable cam extends the second ends of the push rods or retractable bearings to just contact the tops of the peaks of the track, providing zero speed output. As the cam is extended, the speed ratios increase from a one to one ratio to an unlimited ratio with maximum cam extension and gearing combinations associated with the casing, such as when a second cam ring is included. For example, the casing may have a second juxtaposed chamber defined by a second periodic track with extendable bearings sized so that its peaks just contact the extended cam. The chamber of this second track is structured to be in communication with the chamber of the first periodic track to allow the cam to enter either chamber. The drive shaft and cam may be shifted using conventional means, such as gearing system, to move the extended cam into the second chamber. The cam is then further extended to activate the second track to provide increased speed output. Thus, if a series of juxtaposed tracks wiith differing sized and variable number of peaks and bearings are cooperatively associated with a shiftable variably displaceable cam, and unlimited number of combinations of torques and speeds result. Additionally, applicant's invention may also be combined with conventional gearing systems to provide unlimited torque output combinations.

Applicant's invention provides a highly efficient speed transmission wherein the outputs can be adjusted by varying the speed of the driving shaft, the extension of the cam, or the torque of the rotating casing via conventional gearing mechanisms or a second variable speed transmission operable associated with the first transmission. It also provides a transmission particularly suited for use with constant high speed high torque drive systems. The engine drive can be set at maximum efficiency output, and the torque then adjusted with the variable speed transmission to operate the entire drive train at maximum efficiency. The invention thus not only can be utilized to take advantage of its own efficiencies, but can be used with engine adjustments to operate the entire drive train at the maximum efficiency. When used with a front wheel drive automobile, the cumbersome heavy rear wheel transmission system is eliminated. Thus, the increased efficiencies result not only from operating the drive train at optimal conditions, but because the weight of the entire vehicle is reduced.

The invention is also suited for use with low torque low speed drive trains, such as bicycles. As shown by various studies, e.g. Adams: Influence of Age, Sex and Body Weight on the Energy Expended on Bicycle Riding, *J. Appl. Physical.*, p. 22 (1967), the efficiency of a cyclist is dependent upon the the pedaling rate. According to DeLong: Bicycling, the Art and Science, *Chilton Book Company,* Adnor, PA. (1974), there is a maximum optimal pedaling rate where deviation from the rate reduces the overall cycling efficiencies as low as 21 percent. To reduce strain, the cyclist selects his optimal pedaling speed and then selectively adjusts the speeds and torques by operating a control, such as a lever activated hydraulic cylinder system to displace the cam a predetermined distance. The fluid lines are pressurized to extend the cam cylinder in response to the user's operation of a pressure valve system. The low torque also enables the push rods, when constructed of a strong low friction material, such as nylon or teflon, to be used without bearings. The casing of the track is also preferably made of a similar low friction material as the push rods. These light weight materials and the variable speed transmission increase the vehicle efficiency because of the weight savings and fewer number of moving parts. Applicant's invention is compact and can be sized to retrofit and replace existing transmission systems. The invention can thus be sold as a standardized kit to replace conventional gearing systems such as those presently used with ten speed bicycles. The invention provides an efficient, smooth, radial, transmission that eliminates the problems associated with operating a series of complex less efficient gearing systems.

DESCRIPTION OF THE ILLUSTRATED EMBODIMENTS

Figure 1:
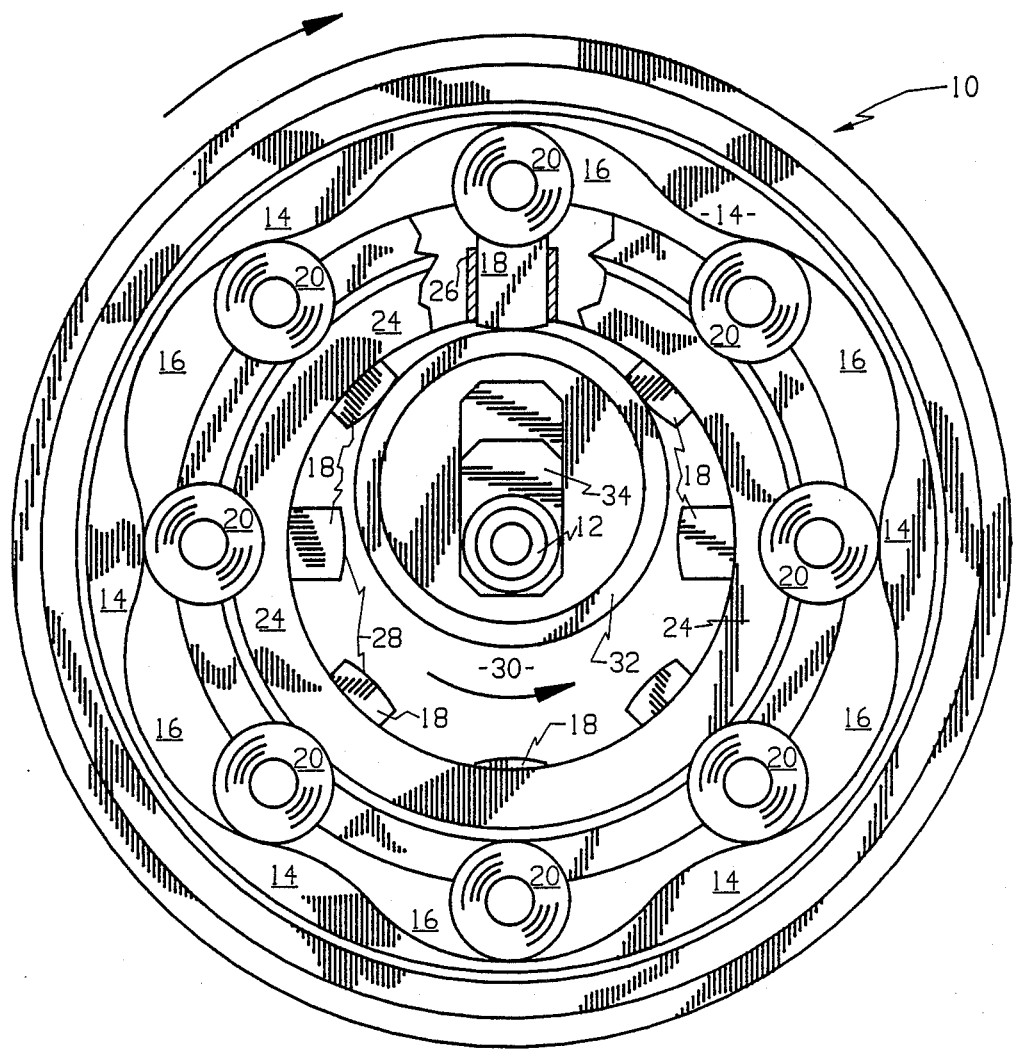
FIG. 1 is a cross-sectional view normal the shaft of the transmission using retractable push rods.

As shown in FIG. 1, a casing 10 is journal mounted onto a shaft 12. The casing 10 has a periodic track 14 defining an inner chamber 16. A plutality of retractable push rods 18 with bearings 20 attached to one end run along the track 14. A housing 24 is journal mounted to the drive shaft 12 within the chamber 16. The housing 24 has a plurality of apertures (not shown) radially spaced equidistant around the shaft 12 into which the push rods 18 are retractably mounted. The push rods 18 are biased outwardly by a return spring 26 surrounding the base 18 of the retractable push rods 18 so the bearings 20 are urged against the track 14. The housing 24 has an inner chamber 30 structured to accommodate the cam's 32 variable rotation. The housing 24 holds the push rods 18 such that the base 28 of the push rods 18 extend into the chamber 30 of the housing 24 to be selectively contacted by the cam 32. The cam 32 has a circular cross-section. The bearings 20 of the push rods 18 extend beyond the housing 24 a predetermined distance, when selectively activated by the offset cam 32. The bearings 20 push against the incline of the periodic track 14 with a force directly proportional to the amount of cam 32 displacement. The bearings 20 shown in FIG. 1 are roller bearings in a T configuration, but could also be needle bearings.

The cam 32 is extendably mounted to the shaft 12 such that it may be selectively displaced by activation of a cylinder 34. Associated with the cylinder 34 is a conventional mechanized worm gear system (not shown), which extends the cylinder 34 to variably extend the cam 32, a pre-selected distance chosen by the user.

As the bearings 20 are selectively activated by the cam 30, their linear displacement is translated into rotational motion as the bearings 20 push against the incline of the periodic track 14 to rotate the casing 10.

Figure 2:
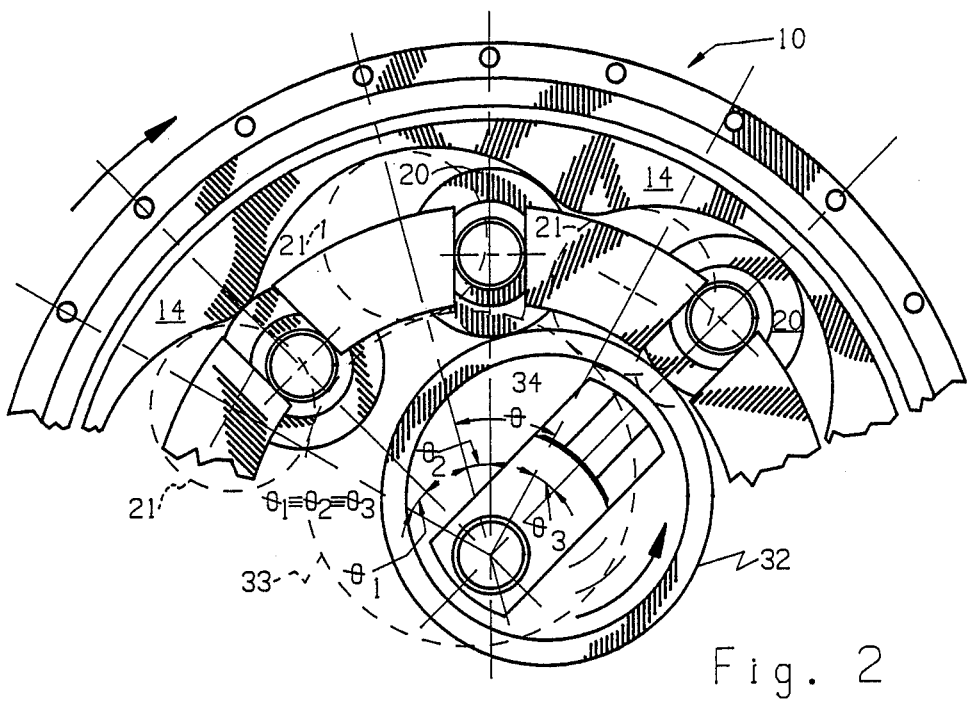
FIG. 2 is a partial cross-sectional view normal the shaft of another embodiment of the invention using retractable bearings.

FIG. 2 is a cut-away view of one embodiment of applicant's invention particularly adapted for mopeds, automobiles or other heavy duty applications. The cam 32 is extended via an hydraulically activated cylinder 34 or other mechanical means such as a gear or internal cam to extend the cam 32. Retractably mounted bearings 20 are selectively reciprocated by the periodic track 14 as the casing 10 is turned by a drive chain (not shown). The bearings 20 are shown displaced an angle $\phi$ to move the cam 32 to position 33. $\phi/\phi_1 = i$; $(\phi_1 = \phi_2 = \phi_3)$, where i is the ratio of the displacement angles $\phi$ between the bearings as the cam moves from position 32 to position 33. The position of the bearings 21 and the cam 33 are shown in phantom lines. The reciprocating bearings 20 selectively rotate the cam 32 to turn the drive shaft 12. The torque output of the drive shaft 12 is directly proportional to the extension of the variable cam 32 and the rotational input torque to the casing 10.

Figures 3, 4:
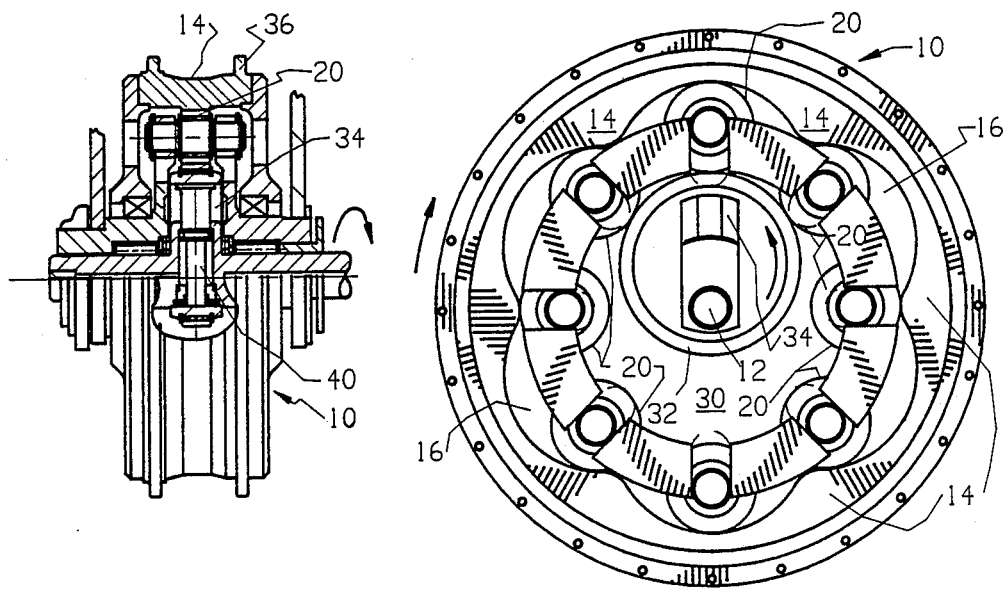
FIG. 3 is a cross-sectional view along the shaft of the embodiment of applicant's invention using retractable bearings.
FIG. 4 is a cross-sectional view normal the shaft of a polygonal cam embodiment of applicant's invention using retractable push rods.

FIG. 3 is a cross-sectional view of applicant's invention utilizing a center variable throw cam control operated by a servo hydraulic circuit (not shown). Retractable bearings 20 are reciprocated by the periodic track 14 as the casing 10 rotates. The casing has sprockets 36 to accommodate a drive chain (not shown). The hydraulic cylinder 34 is in communication with a hydraulic circuit (not shown). The hydraulic circuit (not shown) selectively pressurizes the lines 40 to extend the cylinder 34 a pre-selected distance selected by the user.

FIG. 4 is a cross-sectional view of applicant's invention shown in FIG. 3, shown normal the drive shaft 12.

Figure 5:
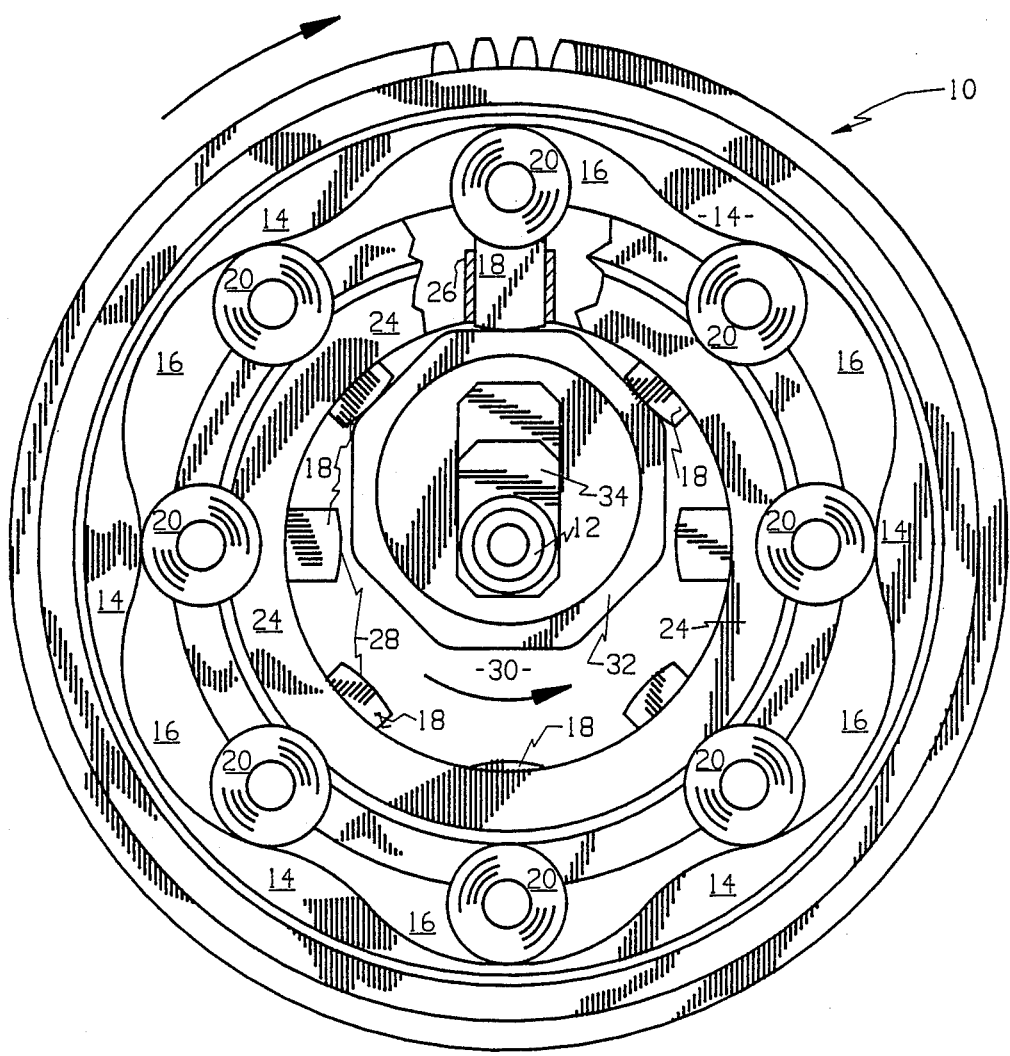
FIG. 5 is a cross-sectional view normal the shaft of a polygonal cam embodiment of applicant's invention using retractable push rods.

FIG. 5 is a cross-sectional view of applicant's invention wherein the cross-sectional shape of the cam 32 is polygonal and the track 14 is adapted to accommodate the loci of the second ends 20 of the push rods 18 along a flattened periodic path 14.

Figure 6:
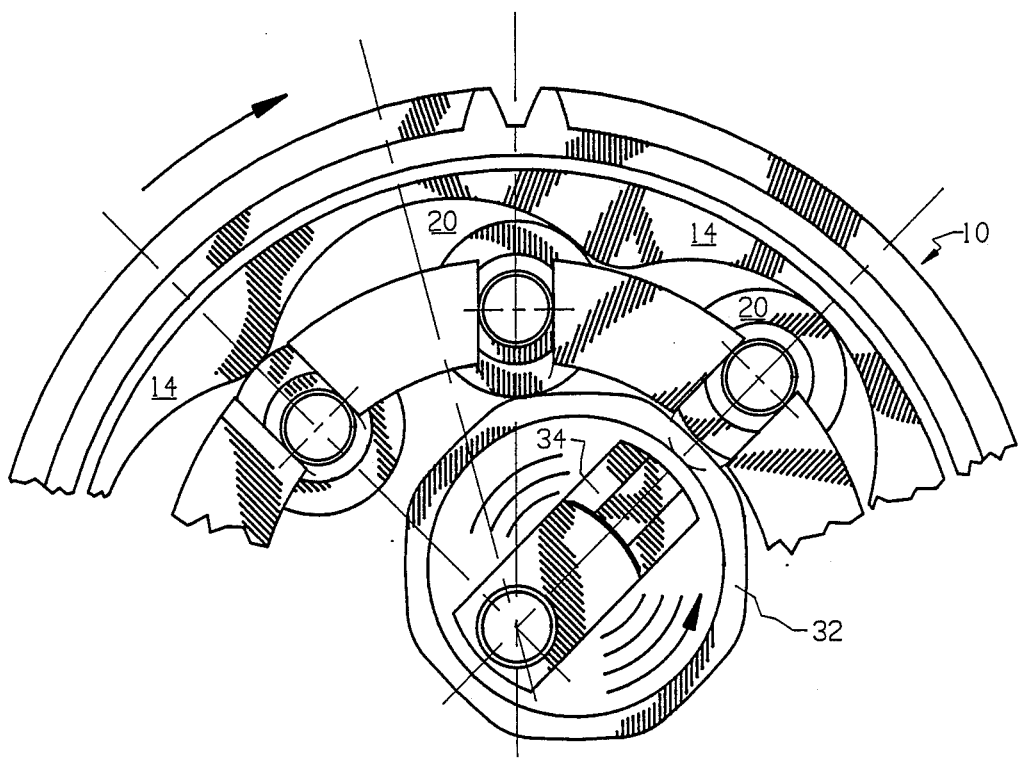
FIG. 6 is a partial cross-sectional view normal the shaft of a polygonal cam embodiment of applicant's invention using retractable bearings.

FIG. 6 is a partial cross-sectional view of applicant's invention wherein the cross-sectional shape of the cam 32 is polygonal and uses retractable roller bearings 20.

Figure 7:
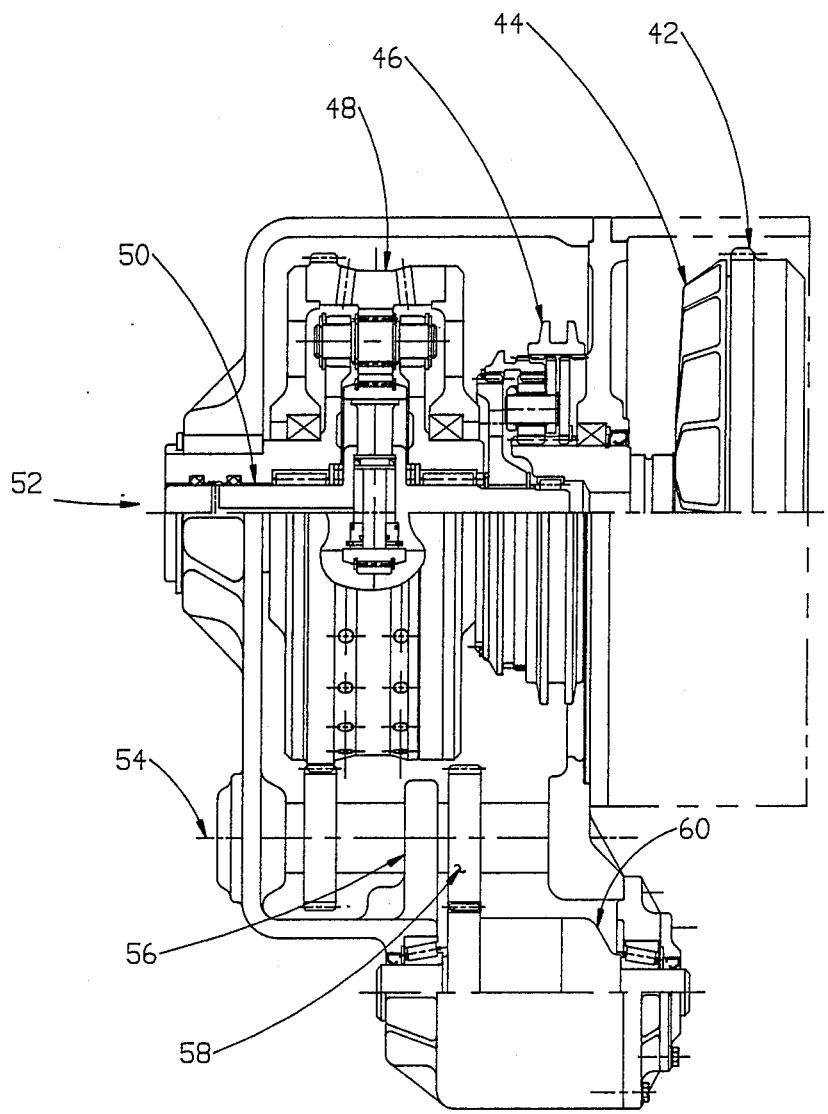
FIG. 7 is a cross-sectional view normal the shaft of a polygonal cam embodiment of applicant's invention using retractable bearings.

FIG. 7 is a cross-sectional view of applicant's invention associated with a transmission for a transverse engine having a flywheel 42, a clutch 44, reverse gear 46, speed variator idle position 48, driven shaft 50, speed displacement servo control inlet 52, driving shaft 54, parking gear 56, final drive 58, and differential gear 60. Needle bearings 38 are shown interposed between the cam 32 and the bearings 20 to minimize frictional losses. Other conventional rolling elements may also be utilized to minimize frictional losses.

Figure 8:
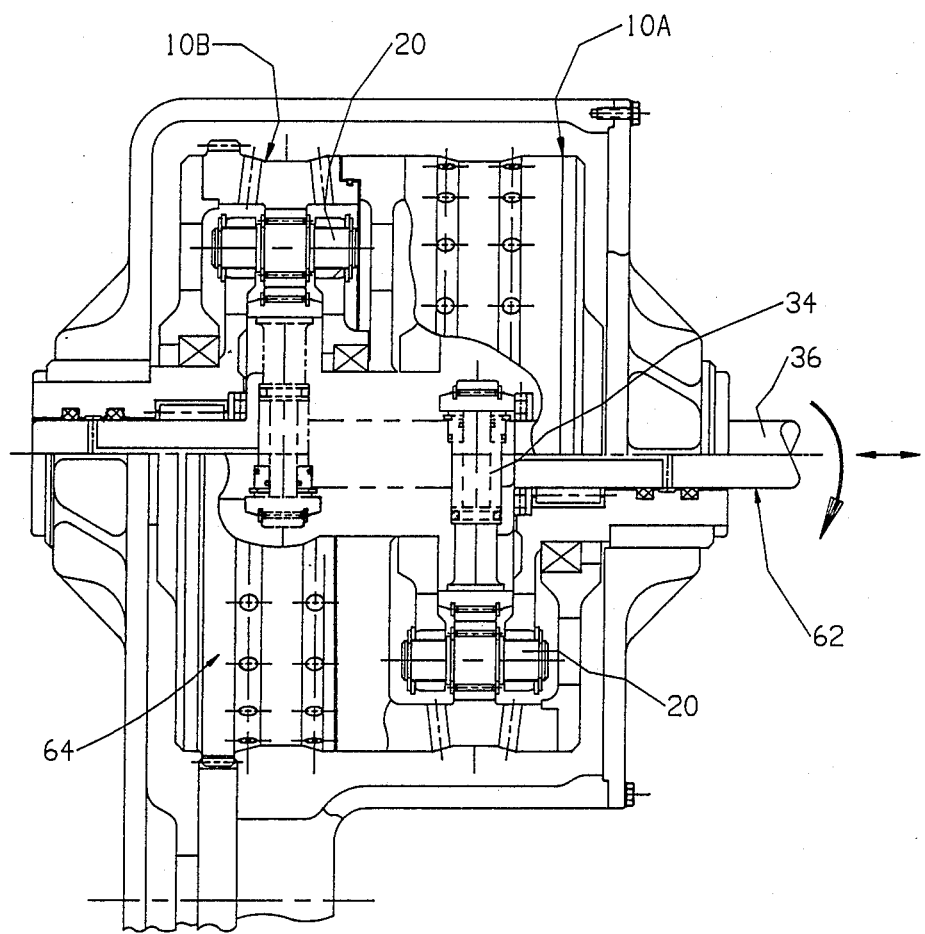
FIG. 8 is a cross-sectional view of two juxtaposed transmissions associated with a common shiftable drive shaft.

FIG. 8 is a cross-sectional view of two juxtaposed transmissions 10A, 10B associated with a common shiftable drive shaft 36. Transmission 10A, has a secondary track 14 a different number of bearings (not shown) than transmission 10B, and two less periods than the number of bearings. The arrows show the power in 62 and the power out 64.

Figure 9:
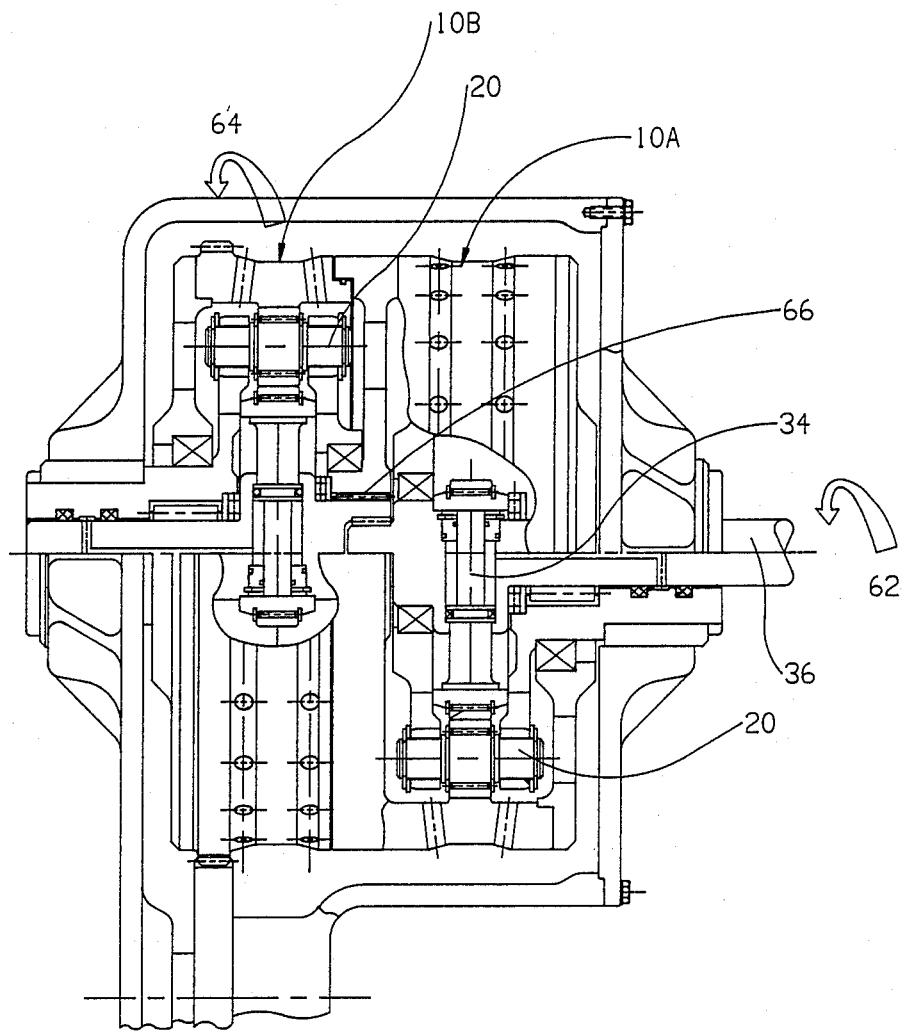
FIG. 9 is a cross-sectional view of the preferred embodiment of two juxtaposed transmission associated with a spline.

FIG. 9 is a cross-sectional view of a preferred embodiment of two juxtaposed transmissions 10A, 10B associated with a common spline 66 translating the output rotation of the casing 10 from transmission 10A to turn the drive shaft 12 of transmission 10B. Transmission 10A, has a secondary track 14 with a different number of bearings (not shown) than transmission 10B, and two less periods than the number of bearings. The arrows show the power in 62 and the power out 64.

Applicant's invention can be used either as a variable speed transmission or a gear reducer depending upon the application of the inputs. The torque ratios are then varied by adjusting the cam displacement.

Although the specification has made reference to the illustrated embodiments, it is not intended to restrict the scope of the appended claims. The claims themselves recite those features regarded as essential to the invention.

I claim:

1. A variable speed transmission for adjusting torque output comprising:

a variably extenable offset cam adjustably attached to a rotatable drive shaft providing torque inputs to the transmission;

means variably associated with the cam to extend said cam a distance from the drive shaft selected by a user;

a stationary housing journal mounted to the drive shaft defining a chamber surrounding the cam to accommodate its variable rotation; said housing having a plurality of radially displaced equidistant apertures in communication with the interior and exterior of the housing;

a plurality of retractably mounted push rods having first ends and second ends slideably mounted within the housing apertures; the first ends each extending into the interior of the housing to selectively contact the cam, and the second ends each extending beyond the housing a predetermined distance when the first ends are contacted by the cam to provide minimum torque and maximum speed output when fully extended, and maximum torque and minimum speed output when minimally extended;

a rotatable casing journal mounted to the drive shaft and encasing the stationary housing, said casing having a periodic undulating cyclical track surrounding and in passing registration with the second ends of the push rods with the track having peaks and valleys shaped to be engaged by the second ends of the push rods when activated, with i. said peaks inclined to maintain an effective slope along the segments contacted by the second ends of the push rods to provide uniform torque output against the track to rotate the casing; and of a height to maintain the desired maximum torque when contacted by the second ends of the push rods when minimally extended by the cam at minimum displacement, and ii. said valleys of a depth to accommodate the second ends of the push rods when fully extended by the variable cam at maximum displacement, and means associated with the casing to translate the output rotation to a drive train.

2. A variable speed transmission according to claim 1, wherein the periodic track has two less periods than the number of push rods.

3. A variable speed transmission according to claim 1, wherein the means to extend the cam comprises a cylinder and piston attached between the drive shaft and the cam, said cylinder and piston structured to be selectively extended a predetermined distance selected by a user.

4. A variable speed transmission according to claim 1, wherein the second ends of the push rods include bearings.

5. A variable speed transmission according to claim 1, wherein the push rods are structured as retractable bearings.

6. A variable speed transmission according to claim 1, wherein the plurality of push rods are biased outwardly to extend the second ends to run along the periodic track.

7. A variable speed transmission according to claim 1, wherein the displacement of the cam varies the torque ratios in excess of one to one.

8. A variable speed transmission for adjusting torque output to a drive shaft comprising:

a variably extendable offset cam adjustably attached to a rotatable drive shaft to drive the drive shaft when the cam is rotated;

means variably associated with the cam to extend said cam a distance from the drive shaft selected by a user;

a stationary housing journal mounted to a drive shaft defining a chamber surrounding the cam to accommodate its variable rotation; said housing having a plurality of radially displaced equidistant apertures in communication with the interior and exterior of the housing;

a plurality of retractably mounted push rods having first ends and second ends slideably mounted within the housing apertures; the first ends each extending into the interior of the housing to selectively contact and drive the cam, and the second ends each extending beyond the housing a predetermined distance;

a rotatable casing providing rotational inputs journal mounted to the drive shaft encasing the stationary housing, said casing having a periodic undulating cyclical track with peaks and valleys surrounding and is passing registration with the second ends of the push rods to selectively engage the second ends and extend the first ends to drive the cam and transfer inputs from the track to the cam to provide minimum torque and maximum speed output when the rods are fully extended, and maximum torque and minimum speed output when the rods are minimally extended; with i. said peaks inclined along the segments engaging the second ends to maintain effective engagement and provide continuous rotational torque output and extend the push rods to drive the variable cam and rotate the drive shaft, and of a height selected to provide the maximum push rod extension to provide the desired maximum speed and minimum torque output; and ii. said valleys of a depth to accommodate the second ends of the push rods when the variable cam is fully extended; and means associated with the drive shaft to translate the output rotation to a drive train.

9. A variable speed transmission according to claims 1 or 8, wherein the cam's cross-sectional area is circular and the periodic track is sinesoidal.

10. A variable speed transmission according to claims 1 or 8, wherein the cam's cross-sectional area is polygonal and the periodic track is a flattened sinesoidal track.

11. A variable speed transmission according to claims 1 or 8, including a plurality or roller elements positioned between the cam and the first ends of the push rods to minimize frictional losses.

12. A variable speed transmission according to claims 1 or 8, including a plurality of secondary periodic tracks with push rods structured as retractable bearings attached to the casing, and juxtaposed to the periodic track such that each succeeding track can accommodate and interact with the extendable rotating offset cam when the cam is shifted in alignment with each respective secondary periodic track.

13. A variable speed transmission according to claim 12, wherein each secondary track has a different number of bearings, and two less periods than the number of bearings.

* * * * *